United States Patent Office.

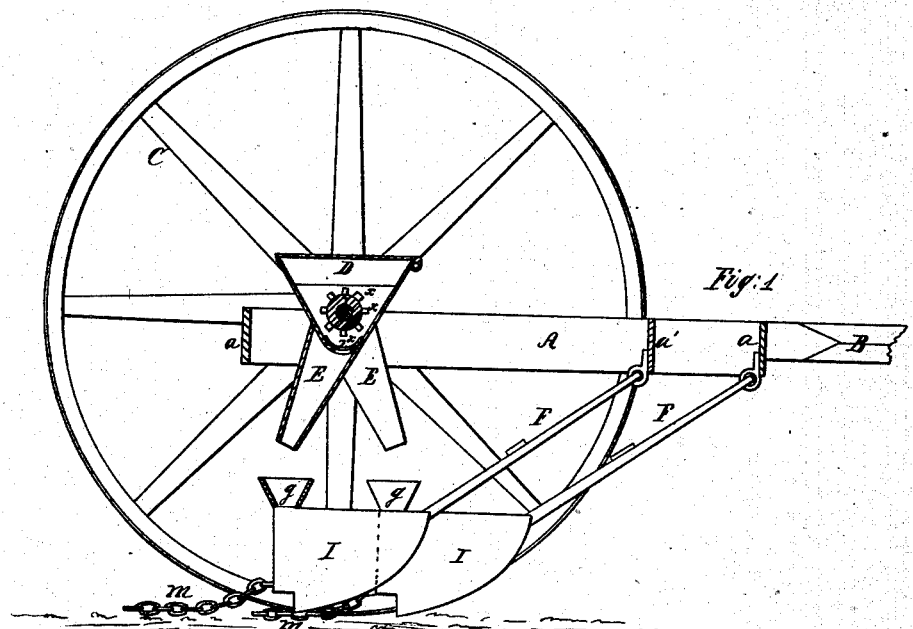
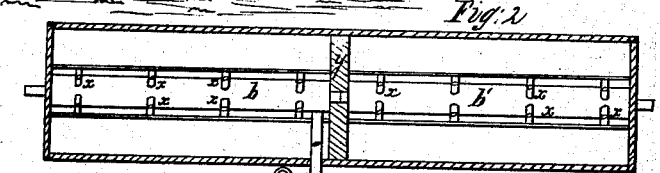
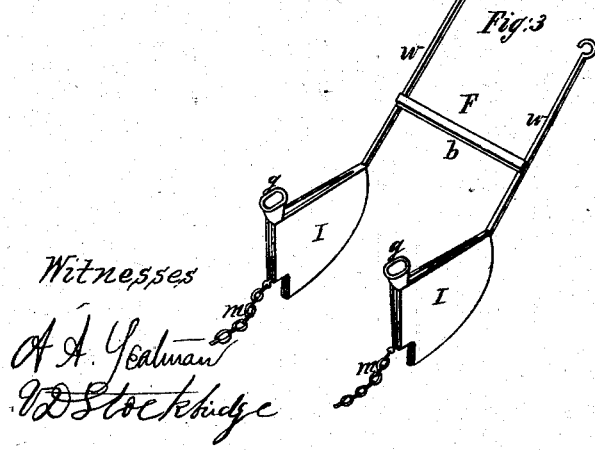

S. H. WHEELER AND WILLIAM TUTTLE, JR., OF DOWAGAIC, MICHIGAN.

Letters Patent No. 61,903, dated February 5, 1867.

---

IMPROVEMENT IN GRAIN DRILLS.

---

*The Schedule referred to in these Letters Patent and making part of the same.*

---

TO ALL WHOM IT MAY CONCERN:

Be it known that S. H. WHEELER and WILLIAM TUTTLE, Jr., of Dowagaic, in the county of Cass, and in the State of Michigan, have invented certain new and useful Improvements in Grain Drills, and do hereby declare that the following is a full, clear, and exact description thereof, reference being had to the accompanying drawings, and to the letters of reference marked thereon. In the annexed drawings, making part of this specification—

A represents the frame of the machine, consisting simply of two side and two ends pieces secured firmly together, the side pieces being connected or provided near their forward ends by means of an additional cross-piece or bar, $a'$. This frame is supported upon the axle of the machine. $b\ b'$ represent the two portions of the axle, said axle being divided at its centre and having bearings at the inner ends of the two parts in the division board $y$. C represents the wheels, which are secured permanently on the outer ends of the parts of the axle, and which serve to support and carry the machine. The axles are provided with pins, $x\ x$, for agitating the grain in the hopper and preventing it from clogging and not flowing regularly to the seed openings in the bottom of the hopper. D represents the grain-hopper, which, as usual, lies crosswise of the machine, said hopper being constructed in any of the known and usual ways, with seed openings in its bottom at suitable distances apart, which said openings are opened or closed or regulated by means of a slide suitably located either above or beneath them. E E represent the discharge spouts, which are connected to the under side of the hopper for receiving and conveying down the grain as it falls from the hopper. These spouts are not all secured on at the same angle. The mouth of one sits forward of a vertical line through the shaft or axle, and the next one to it back of said line, and so alternating throughout. I I represent the shoes, which are made of metal, and rounding on their under sides from their points to their heels. These shoes may be made by taking two plates of metal in the shape represented, securing them together at their curved edges, and leaving them open at top and rear end. A small spout, $g$, is secured upon each shoe to receive the grain from the discharge spouts. $m\ m$ represent chains, which are secured to the heels of the shoes, and which drag on the ground after the said shoes for the purpose of covering the grain after it falls into the furrow made by the shoe. The shoes are connected together in pairs by means of the draught-frame F, composed of the rods $w\ w$ and cross-bar $v$. The frames F are secured, some to the forward frame-piece $a$, and some to the cross-piece $a'$, in such a manner that one of the shoes of one of the frames runs between those of the next frame to it. As the draught-bars $w\ w$ are of the same length, and one of the frames composed of these bars is secured further forward on the frame than the next one to it, it will be seen that the shoes are not in line, but, that each alternate shoe is some inches in rear of a line drawn across the points of the foremost ones. By this arrangement of having the points of some of the shoes back of those of the others, there is less liability of their catching grass and weeds or trash of any kind, and thus clogging. The frames F F are hinged to the frame A, so that they rise and fall to suit the inequalities of the ground, and to enable them to readily pass over obstacles. As the machine moves forward the shoes drag in the ground and open a furrow, while the seed falling into said furrows, at their rear ends, are covered up by means of the chains $m\ m$, which, as before stated, drag upon the ground after the shoes. By dividing the axle, it will be seen that the momentary stoppage of one of the wheels, for any cause, does not stop the revolving of the other end of the axle with its stirrers, and thereby prevent the proper discharge of the grain.

Having thus fully described our invention, what we claim as new, and desire to secure by Letters Patent, is—

1. The arrangement of the divided axle, with the seed-box, discharge spouts E E, and shoes I I, the several parts being constructed in the manner and used for the purpose specified.

2. The arrangement of the frames F F, provided with the shoes I I, in such a manner that the said shoes shall run substantially in the relative position to each other herein described, for the purpose set forth.

3. The arrangement of the chains $m\ m$, with the shoes I I, as and for the purpose herein specified.

In testimony that we claim the foregoing we have hereunto set our hands this 7th day of November, 1866.

S. H. WHEELER,
WILLIAM TUTTLE, Jr.

Witnesses:
W. A. STOW,
H. B. DENMAN.